(12) United States Patent
Lee et al.

(10) Patent No.: US 11,133,547 B2
(45) Date of Patent: Sep. 28, 2021

(54) RECHARGEABLE BATTERY

(71) Applicant: Samsung SDI Co., Ltd., Yongin-si (KR)

(72) Inventors: Jong-Ha Lee, Yongin-si (KR); Nayeon Oh, Yongin-si (KR); Jun-Sun Yong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/312,941

(22) PCT Filed: May 24, 2017

(86) PCT No.: PCT/KR2017/005372
§ 371 (c)(1),
(2) Date: Dec. 21, 2018

(87) PCT Pub. No.: WO2018/012728
PCT Pub. Date: Jan. 18, 2018

(65) Prior Publication Data
US 2019/0221792 A1 Jul. 18, 2019

(30) Foreign Application Priority Data

Jul. 12, 2016 (KR) .................. 10-2016-0088231

(51) Int. Cl.
*H01M 50/172* (2021.01)
*H01M 10/0525* (2010.01)
(Continued)

(52) U.S. Cl.
CPC ....... *H01M 50/172* (2021.01); *H01M 10/058* (2013.01); *H01M 10/0525* (2013.01);
(Continued)

(58) Field of Classification Search
CPC .. H01M 2/0217; H01M 2/30; H01M 10/0525; H01M 10/058; H01M 50/147;
(Continued)

(56) References Cited

U.S. PATENT DOCUMENTS 6,455,190 B1  9/2002  Inoue et al.
2004/0191612 A1* 9/2004  Akita ................ H01M 10/0431
                                            429/94
(Continued)

FOREIGN PATENT DOCUMENTS

CN   1289153 A   3/2001
CN   1705155 A   12/2005
(Continued)

OTHER PUBLICATIONS

EPO Extended Search Report dated Dec. 2, 2019, for corresponding European Patent Application No. 17827802.4 (6 pages).
(Continued)

*Primary Examiner* — Miriam Stagg
*Assistant Examiner* — Lilia Nedialkova
(74) *Attorney, Agent, or Firm* — Lewis Roca Rothgerber Christie LLP

(57) ABSTRACT

A rechargeable battery according to one aspect of the present invention includes: an electrode assembly that includes a first electrode and a second electrode; a case of which one side is opened, and that receives the electrode assembly; a cap assembly that includes a cap plate covering the opened portion of the case; a first current collecting member that is disposed at a lower side of the cap assembly and is thus connected with the first electrode; a sealing member that is made of an insulation material and penetrates the cap plate and the first current collecting member; and a first terminal in which a base portion fixed to an outer side of the cap plate and an extension portion formed to penetrate the sealing (Continued)

member such that first current collecting member is fixed to the cap assembly are formed as a single body.

8 Claims, 4 Drawing Sheets

(51) Int. Cl.
*H01M 10/058* (2010.01)
*H01M 50/147* (2021.01)
*H01M 50/183* (2021.01)
*H01M 50/543* (2021.01)

(52) U.S. Cl.
CPC ....... *H01M 50/147* (2021.01); *H01M 50/183* (2021.01); *H01M 50/543* (2021.01); *Y02E 60/10* (2013.01); *Y02T 10/70* (2013.01)

(58) Field of Classification Search
CPC ............. H01M 50/172; H01M 50/183; H01M 50/543; Y02E 60/10; Y02P 70/50; Y02T 10/70
See application file for complete search history.

(56) References Cited

U.S. PATENT DOCUMENTS

| | | | |
|---|---|---|---|
| 2005/0266279 A1 | 12/2005 | Kim | |
| 2009/0061307 A1 | 3/2009 | Uh | |
| 2011/0104562 A1 | 5/2011 | Byun et al. | |
| 2012/0021277 A1* | 1/2012 | Byun | H01M 2/0469 429/178 |
| 2012/0121971 A1* | 5/2012 | Kim | H01M 2/0473 429/179 |
| 2012/0148884 A1 | 6/2012 | Kim | |
| 2012/0156548 A1 | 6/2012 | Kim | |
| 2013/0059170 A1 | 3/2013 | Kim | |
| 2013/0101875 A1* | 4/2013 | Kim | H01M 2/348 429/61 |
| 2013/0136977 A1* | 5/2013 | Masuda | H01M 2/0202 429/179 |
| 2014/0308575 A1 | 10/2014 | Kim et al. | |
| 2015/0099145 A1* | 4/2015 | Guen | H01M 2/04 429/7 |
| 2015/0180008 A1 | 6/2015 | Lee et al. | |
| 2016/0141588 A1 | 5/2016 | Kim et al. | |

FOREIGN PATENT DOCUMENTS

| | | |
|---|---|---|
| CN | 101383431 A | 3/2009 |
| CN | 101562238 A | 10/2009 |
| CN | 103137908 A | 6/2013 |
| CN | 105609667 A | 5/2016 |
| EP | 2453501 A1 | 5/2012 |
| JP | 2014-96374 A | 5/2014 |
| JP | 5796623 B2 | 10/2015 |
| KR | 10-2011-0047611 A | 5/2011 |
| KR | 10-2012-0073748 A | 7/2012 |
| KR | 10-1222267 B1 | 1/2013 |
| KR | 10-2013-0026971 A | 3/2013 |
| KR | 10-2014-0124247 A | 10/2014 |
| KR | 10-2015-0073738 A | 7/2015 |

OTHER PUBLICATIONS

China Office Action, with English translation, for corresponding China Patent Application No. 201780043152.1, China Office Action dated Apr. 23, 2021 and accompanying Search Report dated Apr. 9, 2021 (14 pgs.).

* cited by examiner

RECHARGEABLE BATTERY

CROSS-REFERENCE TO RELATED APPLICATION(S)

This application is a National Phase Patent Application of International Patent Application Number PCT/KR2017/005372, filed on May 24, 2017, which claims priority of Korean Patent Application No. 10-2016-0088231, filed Jul. 12, 2016. The entire contents of both of which are incorporated herein by reference.

TECHNICAL FIELD

The present invention relates to a rechargeable battery.

BACKGROUND ART

Unlike a primary battery that cannot be charged, a rechargeable battery can be charged and discharged. Low-capacity rechargeable batteries are used as power supplies for small electronic devices, such as cellular phones, notebook computers, and camcorders, while high-capacity rechargeable batteries are used as power supplies for hybrid vehicles and the like.

In general, the rechargeable battery includes a case where an electrode assembly is received and a cap assembly that closes and seals the case. A positive terminal and a negative terminal may be formed on an upper side of the cap assembly.

Assembly of such a rechargeable battery can connect an uncoated region formed at one side of the electrode assembly to a current collecting member coupled to the cap assembly. Such a rechargeable battery can be manufactured by coupling various parts.

Meanwhile, when the rechargeable battery is installed in a vehicle, parts may be released from the coupled portion due to vibration that is generated when the vehicle is driven. In addition, there is a need to simplify a manufacturing process by reducing the number of assembled parts so as to reduce manufacturing cost of the rechargeable battery.

DISCLOSURE

Technical Problem

An exemplary embodiment of the present invention has been made in an effort to provide a rechargeable battery that can be easily assembled.

Technical Solution

In addition, an exemplary embodiment of the present invention provides a rechargeable battery of which resistance with respect to vibration can be improved.

A rechargeable battery according to one aspect of the present invention includes: an electrode assembly that includes a first electrode and a second electrode; a case of which one side is opened, and that receives the electrode assembly; a cap assembly that includes a cap plate covering the opened portion of the case; a first current collecting member that is disposed at a lower side of the cap assembly and is thus connected with the first electrode; a sealing member that is made of an insulation material and penetrates the cap plate and the first current collecting member; and a first terminal in which a base portion fixed to an outer side of the cap plate and an extension portion formed to penetrate the sealing member such that first current collecting member is fixed to the cap assembly are formed as a single body.

The base portion may have a size that corresponds to an upper surface of the sealing member, and the extension portion may extend from a bottom side of the base portion and penetrate the sealing member such that the first current collecting member is fixed to the cap assembly.

The base portion and the extension portion may be made of the same material.

The cap assembly may further include a coupling portion that is integrally formed with the cap plate, and protrudes from a bottom side to which the second current collecting member is coupled in the cap plate and thus penetrates the second current collecting member.

The cap assembly may further include a second terminal that is integrally formed with the cap plate and protrudes from a portion of a top surface of the cap plate.

The second terminal may be disposed adjacent to the second current collecting member.

Advantageous Effects

The rechargeable battery according to an exemplary embodiment of the present invention is provided with an integrally formed first terminal such that durability with respect to vibration can be significantly improved. In addition, a first terminal of a conventional rechargeable battery is formed by assembling a plurality of parts, but the rechargeable battery according to the exemplary embodiment of the present invention uses the integrally formed first terminal so that a manufacturing process can be more simplified. Accordingly, manufacturing cost can be saved.

MODE FOR INVENTION

Figure 1:
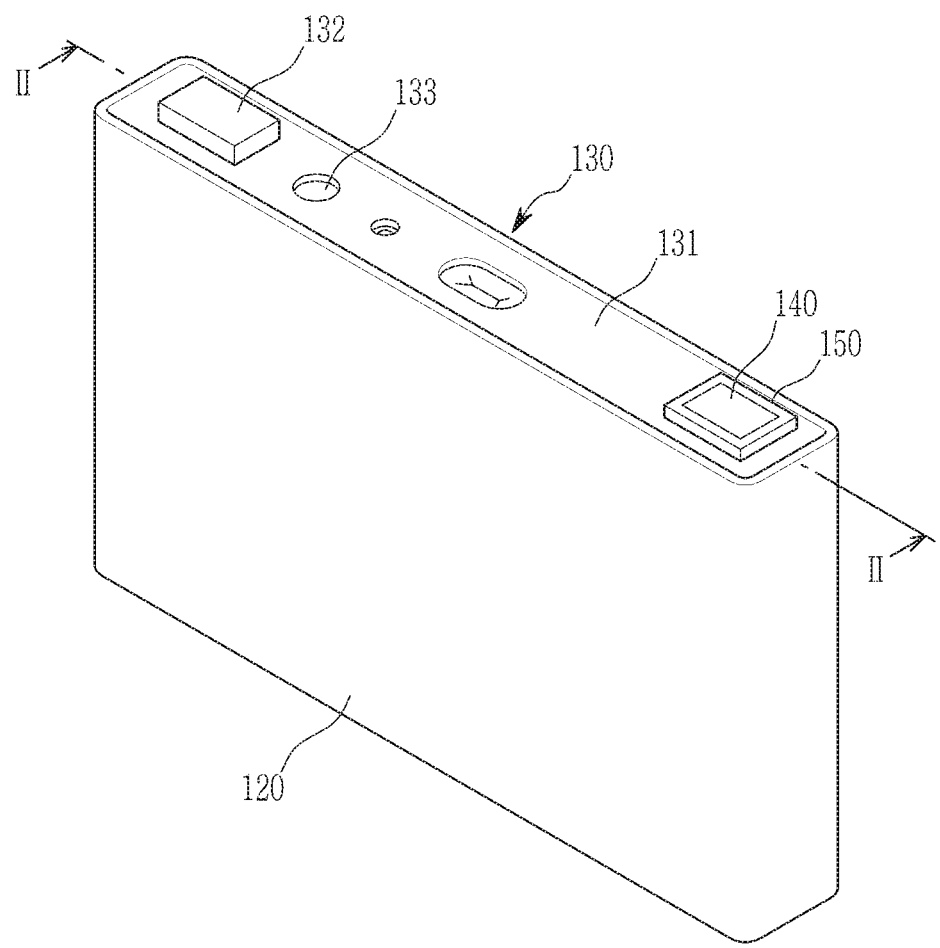
FIG. 1 is a perspective view of a rechargeable battery according to an exemplary embodiment of the present invention.

Hereinafter, the present invention will be described more fully with reference to the accompanying drawings, in which exemplary embodiments of the invention are shown. As those skilled in the art would realize, the described embodiments may be modified in various different ways, all without departing from the scope of the present invention.

The drawings and description are to be regarded as illustrative in nature and not restrictive. Like reference numerals designate like elements throughout the specification.

In several exemplary embodiments, components having the same configuration will be described representatively in a first exemplary embodiment by the same reference numerals. In exemplary embodiments other than the first exemplary embodiment, only configurations different from those of the first exemplary embodiment will be described.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Figure 2:
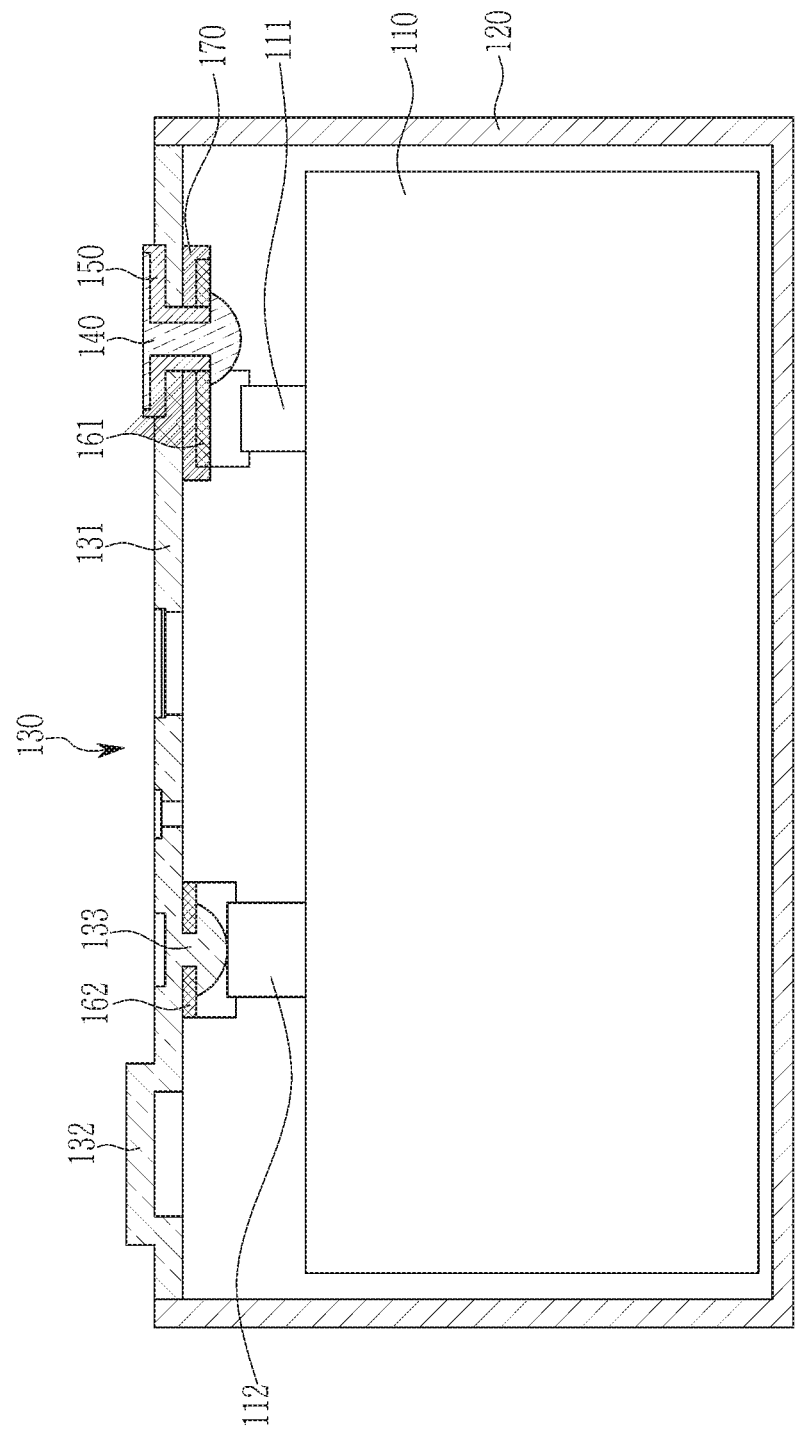
FIG. 2 is a cross-sectional view of the rechargeable battery of the exemplary embodiment shown in FIG. 1, taken along the line II-II.
Figure 3:
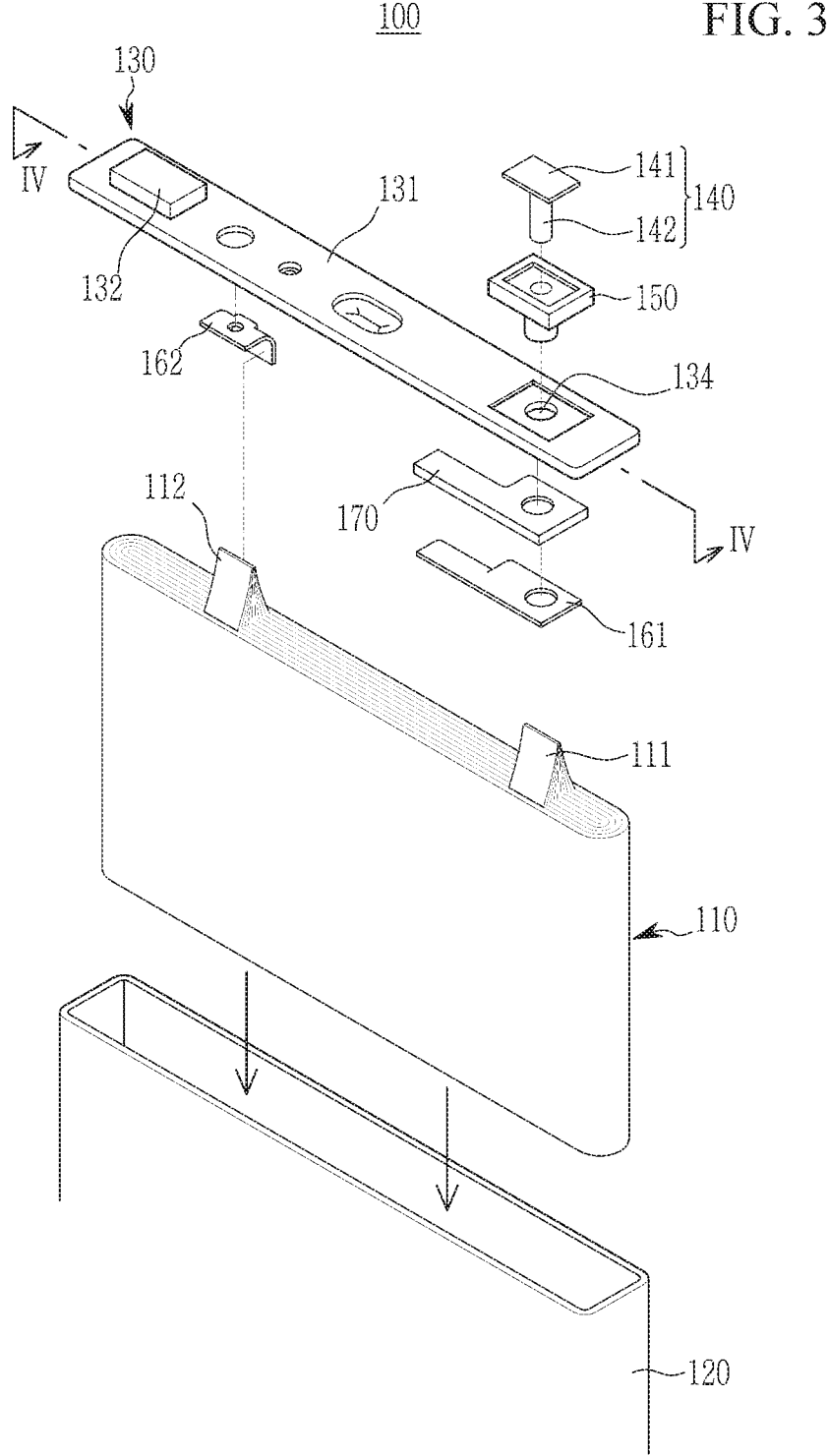
FIG. 3 is an exploded perspective view of the rechargeable battery according to the exemplary embodiment of the present invention shown in FIG. 1.

FIG. 1 is a perspective view of a rechargeable battery according to an exemplary embodiment of the present invention, FIG. 2 is a cross-sectional view of the rechargeable battery according to the exemplary embodiment shown in FIG. 1, taken along the line II-II, and FIG. 3 is an exploded perspective view of the rechargeable battery according to the exemplary embodiment shown in FIG. 1.

Referring to FIG. 1 to FIG. 3, a rechargeable battery 100 according to an exemplary embodiment of the present invention includes an electrode assembly 110, a case 120, a cap assembly 130, a first current collecting member 161, a sealing member 150, and a first terminal 140.

The rechargeable battery 100 according to the exemplary embodiment is exemplarily described as a prism-shaped lithium ion rechargeable battery. However, the present invention is not limited thereto, and the present invention may be applied to variously-shaped batteries such as a lithium polymer battery and a cylindrical battery.

The electrode assembly 110 may include a first electrode 111 and a second electrode 112. The first electrode 111 may be a positive electrode, and the second electrode 112 may be a negative electrode. However, it is not restrictive that the first electrode 111 is a positive electrode and the second electrode 112 is a negative electrode, and they may be changed depending on designs.

One side of the case 120 may be opened. The case 120 receives the electrode assembly 110. Thus, the case 120 may be formed in the shape of, for example, a cuboid. An opening is formed on an upper surface of the case 120. The case 120 may be made of, for example, a metal such as aluminum, stainless steel, and the like.

The cap assembly 130 closes and seals the opened portion of the case 120. For closing and sealing the opened portion of the case 120, the cap assembly 120 includes a cap plate 131. The cap plate 131 covers the opened portion of the case 120. The cap plate 131 may have a shape of a plate that extends in one direction, but this is not restrictive.

The first current collecting member 161 is disposed at a lower side and is connected with the first electrode 111. Since the first current collecting member 161 is connected with the first terminal 140, which will be described later, the first current collecting member 161 can electrically connect the first electrode 111 and the first terminal 140.

Meanwhile, an insulation member 170 may be disposed between the first current collecting member 161 and the cap plate 131. The insulation member 170 prevents the first current collecting member 161 and the cap plate 131 from being electrically connected with each other.

The sealing member 150 is made of an insulation material and penetrates the cap plate 131 and the first current collecting member 161. For this purpose, a portion of the sealing member 150 penetrating the cap plate 131 and the first current collecting member 161 may be formed in the shape of a pipe having a hollow.

Accordingly, the first terminal 140, which will be described later, may penetrate through the hollow. Such a sealing member 150 seals a space between the cap plate 131 and the first terminal 140. Further, the sealing member 150 prevents the first terminal 140 and the cap plate 131 from being electrically connected with each other.

The first terminal 140 includes a base portion 141 that is fixed to an outer side of the cap plate 131, and an extension portion 142 that penetrates the sealing member 150. The first terminal 140 may be electrically connected with the first electrode 111 by the first current collecting member 161. The base portion 141 and the extension portion 142 of the first terminal 140 may be formed as a single body. That is, the first terminal 140 may be a single member rather than an assembly of a plurality of parts. The extension portion 142 of the first terminal 140 is formed to penetrate the sealing member 150 such that the first current collecting member 161 is fixed to the cap assembly 130.

Shapes and structures of the base portion 141 and the extension potion 142 that form the first terminal 140 will be described hereinafter in detail.

The base portion 141 is formed with a size that corresponds to an upper surface of the sealing member 150. The base portion 141 may be similar in size to the upper surface of the sealing member 150, or may be smaller than the sealing member 150. When the upper surface of the sealing member 150 is formed in the shape of a rectangle, the base portion 141 may be formed in the shape of a rectangular plate, but this is not restrictive.

The extension portion 142 extends from a bottom side of the base portion 141 so as to penetrate the sealing member 150. The extension portion 142 is provided to fix the first current collecting member 161 to the cap assembly 130. For this purpose, a through-hole 134 through which the extension portion 142 penetrates may be formed in the cap plate 131.

The extension portion 142 and the base portion 141 may be made of a conductive material. Accordingly, the first current collecting member 161, the extension portion 143, and the base portion 141 may have the same polarity. Meanwhile, the base portion 141 and the extension portion 142 may be made of the same material.

A lower end of the extension portion 142 is connected to the first current collecting member 161. A hole through which the extension portion 142 penetrates may be formed in the sealing member 150. In addition, the sealing member 150 may penetrate through the through-hole 134 formed in the first current collecting member 161. An interior diameter of the hole formed in the sealing member 150 may be relatively larger than or similar to a diameter of the extension portion 143.

As a method for coupling the first current collecting member 161 to the cap assembly 130 by the extension portion 142, a rivet fastening method in which a user inserts the extension portion 142 into a hole formed in the first current collecting member 161 and then processes an end portion of the extension portion 142 by using an additional tool, may be used. However, this is not restrictive.

In a conventional rechargeable battery, a terminal is formed by combining a plurality of parts, but the rechargeable battery 100 according to the exemplary embodiment of the present invention is provided with the first terminal 140, which is formed as a single body and includes the extension portion 142 and the base portion 141, such that durability with respect to vibration can be significantly improved.

In addition, since the first terminal 140 of the rechargeable battery 100 according to the exemplary embodiment of the present invention is provided as a single body, a manufacturing process can be more simplified. Accordingly, manufacturing costs can be saved.

Figure 4:
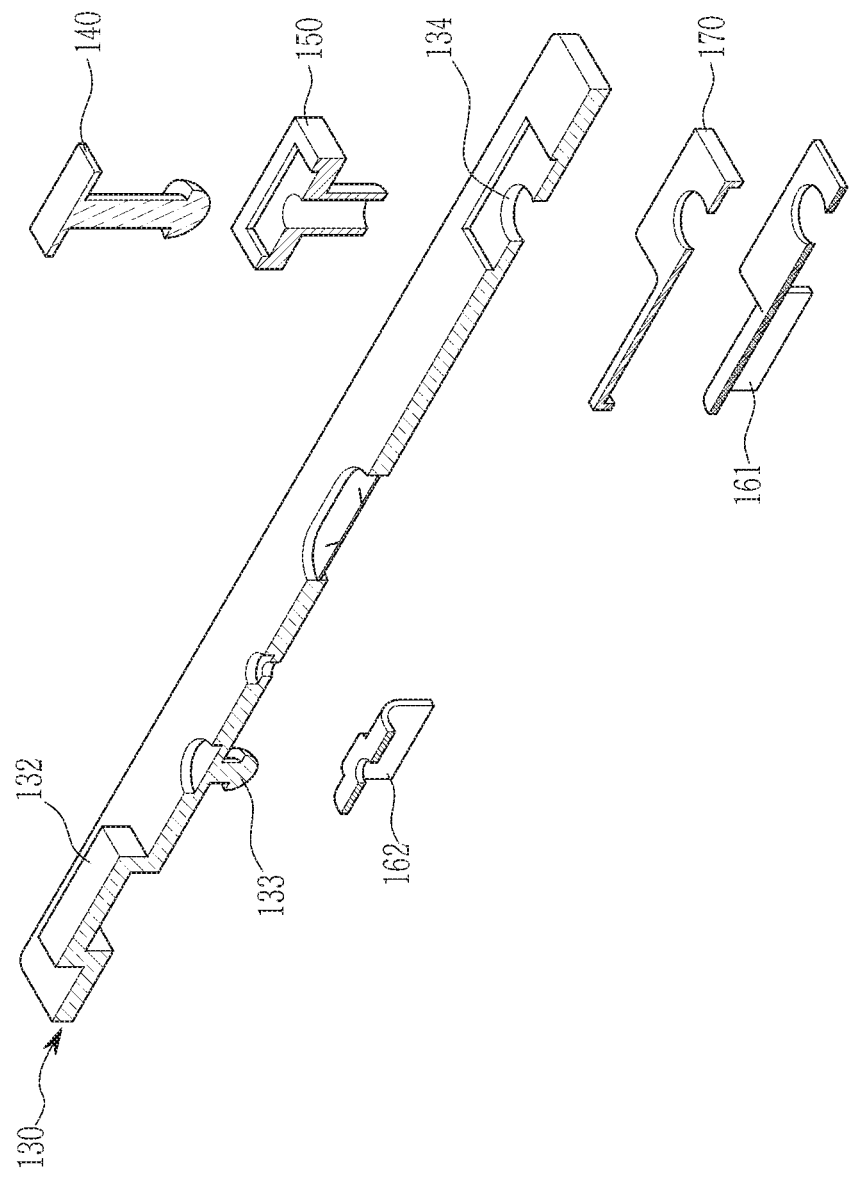
FIG. 4 is a view of the cap assembly in the rechargeable battery according to the exemplary embodiment shown in FIG. 3, taken along the line IV-IV.

FIG. 4 is a view of the cap assembly in the rechargeable battery according to the exemplary embodiment shown in FIG. 3, taken along the line IV-IV.

Referring to FIG. 4, the cap assembly 130 in the rechargeable battery 100 according to the exemplary embodiment of the present invention may further include a coupling portion 133.

The coupling portion 133 is integrally formed with the cap plate 131. The coupling portion 133 protrudes from a bottom side to which a second current collecting member 162 is coupled in the cap plate 131 and thus penetrates the second current collecting member 162. The coupling portion 133 may exemplarily be cylindrical.

The second current collecting member 162 is connected with the second electrode 112 (refer to FIG. 3) of the electrode assembly 110 (refer to FIG. 3). The second current collecting member 162 is connected with the cap assembly 130 by the coupling portion 133. Thus, when the second electrode 112 (refer to FIG. 3) is a negative electrode, the cap assembly 130 may have negative polarity. Alternatively, when the second electrode 112 (refer to FIG. 3) is a positive electrode, the cap assembly 130 may have positive polarity.

The coupling portion 133 enables the second current collecting member 162 to be fixed to the cap plate 131. As a method for coupling the second current collecting member 162 to the cap plate 131 by the coupling portion 133, a rivet fastening method in which a user inserts the coupling portion 133 into a hole formed in the second current collecting member 162 and then processes an end portion of the coupling portion 133 by using an additional tool, may be used. However, this is not restrictive.

As described, the coupling portion 133 is integrally formed with the cap plate 131, and accordingly, the coupling portion 133 can be formed together when the cap plate 131 is formed. Thus, when the rechargeable battery 100 (refer to FIG. 3) according to the exemplary embodiment of the present invention is manufactured, the manufacturing process can be more simplified compared to a structure in which a coupling portion and a cap plate are separately manufactured and then coupled together.

In addition, portions where parts are coupled to each other are reduced in the rechargeable battery 100 (refer to FIG. 3) according to the exemplary embodiment of the present invention, and accordingly, resistance to vibration can be improved.

The cap assembly 130 may further include a second terminal 132.

The second terminal 132 is integrally formed with the cap plate 131, and protrudes from a portion of a top surface of the cap plate 131. The second terminal 132 may be disposed adjacent to the second current collecting member 162.

As described above, the cap assembly 130 may have positive polarity or negative polarity by the second current collecting member 162, and thus the second terminal 132 integrally formed with the cap assembly 130 may also have positive polarity or negative polarity.

While the rechargeable battery 100 (refer to FIG. 3) is installed in a vehicle while the second terminal 132 has positive polarity and the first terminal 140 has negative polarity in the rechargeable battery 100 (refer to FIG. 3) according to the exemplary embodiment of the present invention, the second terminal 132 may be electrically connected to a positive connection portion of the vehicle and the first terminal 140 may be electrically connected to a negative connection portion of the vehicle.

Since the second terminal 132 is integrally formed with the cap plate 131, the second terminal 132 can be formed together when the cap plate 131 is manufactured.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims. It will be understood by those skilled in the art that various changes in form and detail may be made without departing from the scope of the present invention. Accordingly, the true scope of the present invention should be determined by the technical idea of the appended claims.

DESCRIPTION OF SYMBOLS

| | |
|---|---|
| 100: rechargeable battery | 110: electrode assembly |
| 111: first electrode | 112: second electrode |
| 120: case | 130: cap assembly |
| 131: cap plate | 132: second terminal |
| 133: coupling portion | 134: through-hole |
| 140: first terminal | 141: base portion |
| 142: extension portion | 150: sealing member |
| 161: first current collecting member | |
| 162: second current collecting member | |
| 170: insulation member | |

The invention claimed is:

1. A rechargeable battery comprising:
an electrode assembly that includes a first electrode and a second electrode;
a case of which one side is opened, and that receives the electrode assembly;
a cap assembly that includes a cap plate covering the opened side of the case;
a first current collecting member that is disposed at a lower side of the cap assembly and is thus connected with the first electrode;
a sealing member that is made of an insulation material and penetrates the cap plate and the first current collecting member; and
a first terminal in which a base portion fixed to an outer side of the cap plate and an extension portion formed to penetrate the sealing member and a through-hole of the first current collecting member such that the first current collecting member is fixed to the cap assembly are formed as a single body, wherein the base portion has a larger perimeter size than the extension portion so as to overlap an upper surface of the sealing member, and wherein the extension portion overlaps and contacts each of a bottom surface of the first current collecting member and a bottom surface of a portion of the sealing member that penetrates the first current collecting member.

2. The rechargeable battery of claim 1, wherein the perimeter size of the base portion corresponds to the upper surface of the sealing member, and
the extension portion extends from a bottom side of the base portion and penetrates the sealing member such that the first current collecting member is fixed to the cap assembly.

3. The rechargeable battery of claim 1, wherein the base portion and the extension portion are made of the same material.

4. The rechargeable battery of claim 1, wherein the cap assembly further comprises a coupling portion that is integrally formed with the cap plate, and protrudes from a bottom side to which a second current collecting member is coupled in the cap plate and thus penetrates the second current collecting member.

5. The rechargeable battery of claim 4, wherein the coupling portion is electrically connected to the second current collecting member.

6. The rechargeable battery of claim 1, wherein the cap assembly further comprises a second terminal that is integrally formed with the cap plate and protrudes from a portion of a top surface of the cap plate.

7. The rechargeable battery of claim 6, wherein the second terminal is disposed adjacent to a second current collecting member.

8. A rechargeable battery comprising:
- an electrode assembly that includes a first electrode and a second electrode;
- a case comprising an opened portion to receive the electrode assembly;
- a cap assembly comprising a cap plate covering the opened portion of the case;
- a first current collecting member arranged at a lower side of the cap assembly and connected with the first electrode;
- a sealing member that is made of an insulation material and penetrates the cap plate and the first current collecting member;
- a first terminal in which a base portion fixed to an outer side of the cap plate and an extension portion formed to penetrate the sealing member and a through-hole of the first current collecting member such that the first current collecting member is fixed to the cap assembly are formed as a single body, wherein the extension portion overlaps and contacts each of a bottom surface of the first current collecting member and a bottom surface of a portion of the sealing member that penetrates the first current collecting member; and
- a second current collecting member arranged at the lower side of the cap assembly and connected with the second electrode, wherein the cap assembly further comprises a coupling portion that is integrally formed with the cap plate, and protrudes from a bottom side of the cap plate to penetrate through a through-hole of the second current collecting member and overlap and contact a bottom surface of the second current collecting member such that the second current collecting member is coupled and electrically connected to the cap plate.

* * * * *